United States Patent [19]

Pike et al.

[11] Patent Number: 4,525,949
[45] Date of Patent: Jul. 2, 1985

[54] TROTLINE STORING AND DISPENSING ARRANGEMENT

[76] Inventors: Jesse L. Pike, Rte. 3, Box 18; Bobby D. Jennings, Uniontown Rd., both of Morganfield, Ky. 42437

[21] Appl. No.: 553,574

[22] Filed: Nov. 21, 1983

[51] Int. Cl.[3] ............................................. A01K 97/00
[52] U.S. Cl. ................................................... 43/57.3
[58] Field of Search .............................. 43/57.3, 57.2

[56] References Cited

U.S. PATENT DOCUMENTS

| | | | |
|---|---|---|---|
| 2,041,322 | 5/1936 | Cantini | 43/57.3 |
| 3,660,924 | 5/1972 | McGee | 43/57.3 |
| 3,775,893 | 12/1973 | McGee | 43/57.3 |
| 4,453,843 | 6/1984 | Martyniuk | 43/57.3 |

Primary Examiner—Gene P. Crosby
Attorney, Agent, or Firm—Warren D. Flackbert

[57] ABSTRACT

A trotline storing and dispensing arrangement which achieves fast tangle free storing and setting of a trotline, viz. a fishing line having multiple leaders with attached hooks used in bait fishing. The trotline is received within and around the central area of a rotatable receptacle, where individually baited hooks are each placed in separate compartments in a bait tray, with leaders for such being snugly positioned in notches along a rim of the rotatable receptacle to assure positive placement during storing, transporting and/or feeding. In view of the rotation capability, trotline dispensing is automatically and readily accomplished by moving the fisherman's boat, on which the arrangement is positioned, away from an anchored trailing end of the trotline.

6 Claims, 4 Drawing Figures

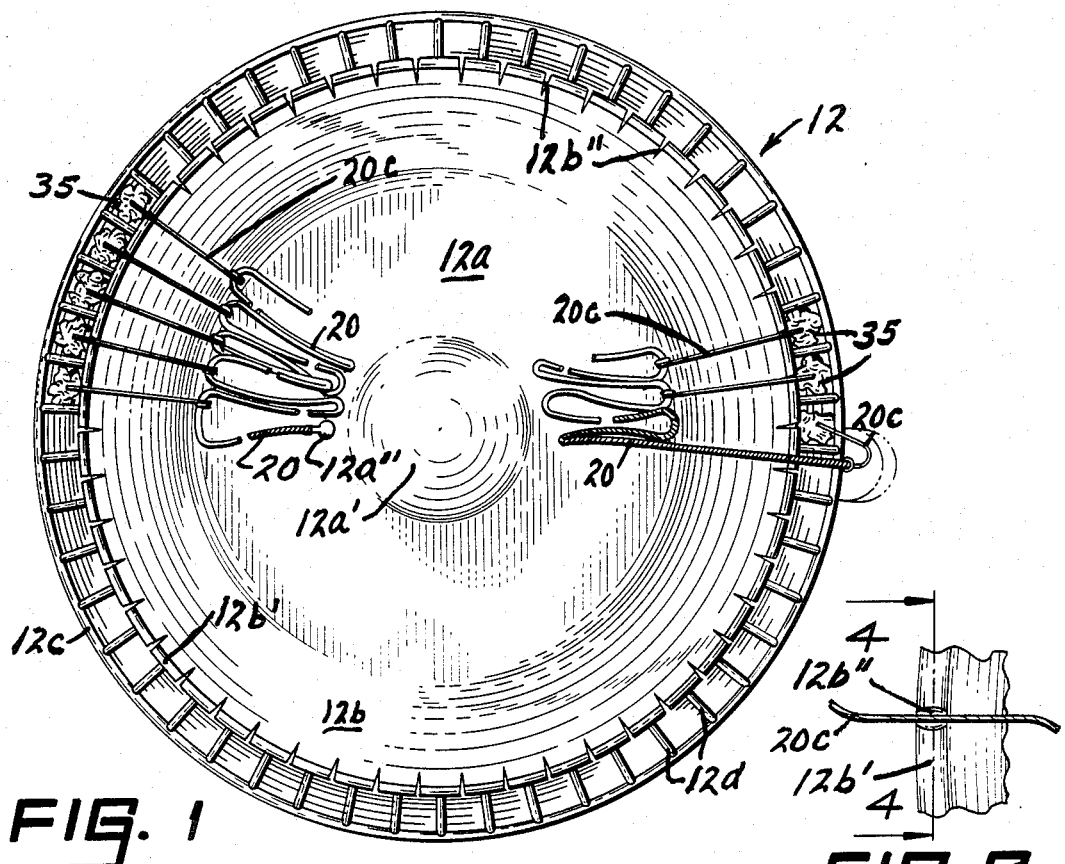
FIG. 1
FIG. 3
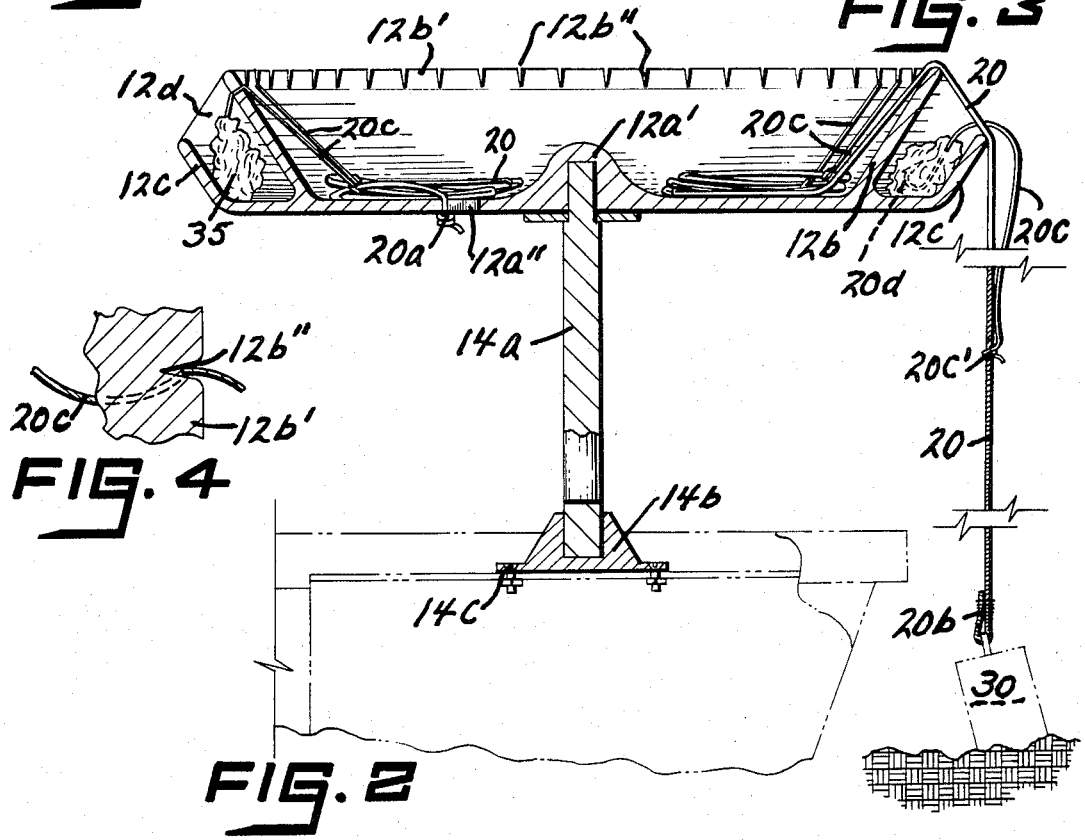
FIG. 4
FIG. 2

TROTLINE STORING AND DISPENSING ARRANGEMENT

As is known, various approaches have been in use heretofore in setting a trotline for use, where the latter is typically characterized as a single, perhaps heavy, line onto which a series of fishhook connecting leaders are attached in a spaced-apart relationship of one to another. Typically, the fishhooks engage bait, where prior difficulty lay, primarily, in the dispensing of the trotline from the carrying receptacle during boat movement. In this latter connection, entanglement of the trotline itself, as well as the bait carrying hooks, presents a problem, oftentimes preventing the orderly placement of the trotline at a desired location in a body of water.

The invention satisfies an important need in trotline storing and dispensing, i.e. presents a circular, in plan view, rotatable trotline receiving receptacle which includes individual bait and hook compartments along a tray area. The arrangement is such that the trotline is disposed within the receptacle so that each of the spaced-apart leaders attached thereto, with associated baited hooks, extend over and through a V-notched rim, in a snug fitting relationship, into the aforesaid compartments. In other words, the instant arrangement serves to prevent entanglement during trotline storing and dispensing, selectively and successively causing each baited hook on a leader to feed into the water upon movement of the fisherman's boat in which the rotatable trotline receptacle is typically carried.

Restated otherwise, when the free end of the trotline is weighted, and the boat caused to move in the region where trotline placement is desired, the trotline storage receptacle rotates, causing the selective dispensing, in successive fashion, of each of the baited hooks on the leaders from the individual storage compartments defined in a tray around the perimeter of the receptacle. Thus, trotline setting is accomplished in an automatic fashion. The trotline arrangement herein is readily mounted, where desired, within a fisherman's boat, affording a degree of flexibility to the user, i.e. as to a particular location in the carrying boat.

In any event, a better understanding of the present invention will become more apparent from the following description, taken in conjunction with the accompanying drawing, wherein FIG. 1 is a top plan view showing a trotline storing and dispensing arrangement in accordance with the teachings of the present invention;

FIG. 2 is a view in elevation, partly in vertical section, further showing the arrangement presented by the instant invention;

FIG. 3 is a detailed and enlarged plan view, partly fragmentary, detailing one of the notches utilized in the practice of the invention; and, FIG. 4 is a view in vertical section, taken at line 4—4 on FIG. 3 and looking in the direction of the arrows, again detailing the relationship illustrated in such figure.

For the purposes of promoting an understanding of the principles of the invention, reference will now be made to the embodiment illustrated in the drawing and specific language will be used to describe the same. It will nevertheless be understood that no limitations of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the trotline storing and dispensing arrangement of the invention is characterized by a receptacle 12, circular in plan configuration (see FIG. 1), rotatably mounted on a flanged spindle 14a extending upwardly from a socket 14b secured, as by threaded means 14c, to any preselected region on a fisherman's boat. As evident in FIG. 2, the upper end of the flanged spindle 14a extends into an enlarged or raised portion 12a' centrally located on bottom wall or surface 12a of the receptacle 12, accomplishing stability and ready rotation. Thus, the receptacle 12 is freely rotatable both during storing and dispensing procedures.

The receptacle 12 includes an angled side wall 12b presenting a rim 12b' having a series of spaced-apart notches 12b" therearound. Each of the notches 12b" assumes a V-shaped configuration having a relatively acute angle, the latter serving a positive retaining relationship with respect to trotline 20 (to be more fully described herebelow). In any event, the relationship between the trotline 20 and each of the V-shaped notches 12b" is particularly apparent in FIGS. 3 and 4, and, as well, evident in FIGS. 1 and 2.

The invention further includes a series of open storage compartments, in a circular tray arrangement, defined by the side wall 12b of the receptacle 12 and another outwardly spaced side wall 12c (see FIG. 2), where radial partitions 12d further define each of such (also see FIG. 1). It should be noted that a single notch 12b" empties into each of the aforesaid storage compartments.

The assembly is further completed through the provision of a keyhole type opening 12a" in the bottom wall or surface 12a of the receptacle 12 which receives an end 20a of the trotline 20 (knotted for positioning purposes), where another end 20b of the trotline 20 is selectively secured to a weight or like anchor 30 (shown in phantom in FIG. 2) for reasons which will become more apparent herebelow.

The typical trotline 20 includes a series of leaders 20c fastened thereto, as at 20c', with each leader 20c having a fishhook 20d at its free end. As should be apparent from the showings of FIG. 1 and 2, each fishhook 20d serves to engage any desired form of bait 35 used for a particular fishing purpose.

As is further evident in FIGS. 1 and 2, the trotline 20 is arranged in successive adjacent passes around the bottom of the receptacle 12, where each leader 20c passes upwardly along the angled side wall 12b, through a notch 12b" in rim 12b', and into a storage compartment, i.e. the hook 20d and bait 35 combination are each individually stored in one of the compartments. As stated, the V-shaped notches 12b" each serve positive retaining and/or a snug fitting relationship with one of the leaders 20c, thereby storing the trotline 20 in a fashion which precludes initial entanglements.

In use, and after the trotline 20, with associated leaders 20c and baited fishhooks 20d, is arranged within the receptacle 12, the anchor or weight 30 is secured to the free end 20b. Thereafter, and when the fisherman's boat is at a desired trotline placement region in a body of water, the anchor or weight 30 is thrown overboard, pulling the trotline 20 with it. As the weight on anchor 30 descends into the water, the leaders 20c are respectively withdrawn from each of their storage compartments, causing initial rotation of the receptacle 12.

As the fisherman's boat moves into and along the desired fishing region, more and more of the trotline 20, and associated baited hooks 20d, are automatically and successively dispensed from the receptacle 12 because of the rotation of the latter. In other words, an orderly and effective withdrawal of baited hooks 20d on the trotline 20 passes into the water as the respective leaders 20c are dispensed from the rotatable receptacle 12. Thus, the invention affords not only effective trotline 20 storage but, importantly, positive and successive dispensing action at the fishing site.

From the preceding, it should be apparent that the trotline storage and dispensing arrangement presented by the invention affords distinct advantages to the user, including, for example, the automatic feeding of the trotline 20 from the receptacle 12 due to the rotatable mounting of the latter, and, as well, the provision of individual storage compartments, in a tray-like arrangement, for the baited hooks 20d, where such serve to confine each without unwanted entanglement with an adjacent baited hook 20d. Thus, an overall free passage or flow of trotline 20 is achieved, unlike any approaches in use heretofore.

The arrangement described hereabove is susceptible to various changes within the spirit of the invention, as, for example, in proportioning; the manner of mounting the receptacle for rotation; the precise configuration of the disclosed notches; the number of notches; and, the like. Thus, the preceding should be considered illustrative and not as limiting the scope of the following claims:

We claim:

1. A trotline storing and dispensing arrangement comprising a receiving receptacle having a horizontal bottom wall, said bottom wall being bifurcated to form outwardly angling spaced-apart first and second side walls, means mounting said receiving receptacle for rotatable movement with respect to a supporting surface, a series of partitions radially positioned between said first wall and said second wall of said receiving receptacle to define storage compartments, said first wall including a rim having a series of spaced-apart notches therealong, and a trotline disposed within said receiving receptacle including leaders secured thereto and respectively extending through each of said notches into one of said storage compartments, where said leaders each retain a bait receiving hook, where said trotline has ends, and where said second wall has an upper rim lower than said rim of said first wall serving a nonentangling relationship between said trotline and said leaders.

2. The trotline storing and dispensing arrangement of claim 1 where said receiving receptacle is circular in plan configuration.

3. The trotline storing and dispensing arrangement of claim 1 where one of said notches is in a communicating relationship with each of said storage compartments.

4. The trotline storing and dispensing arrangement of claim 1 where means on said bottom wall of said receiving receptacle serve to secure one end of said trotline.

5. The trotline storing and dispensing arrangement of claim 1 where a weight is secured to another end of said trotline.

6. The trotline storing and dispensing arrangement of claim 1 where each of said notches assumes an acute V-shaped configuration snugly securing a leader and selectively separating each along said trotline.

* * * * *